United States Patent
Bhattacharjee et al.

(10) Patent No.: US 10,674,405 B2
(45) Date of Patent: Jun. 2, 2020

(54) SYSTEM AND METHOD FOR THROTTLING CARRIER AGGREGATION ACTIVATION

(71) Applicant: APPLE INC., Cupertino, CA (US)

(72) Inventors: Deepankar Bhattacharjee, Milpitas, CA (US); Sreevalsan Vallath, Dublin, CA (US); Carola Faronius, Jarfalla (SE)

(73) Assignee: Apple Inc., Cupertino, CA (US)

( * ) Notice: Subject to any disclaimer, the term of this patent is extended or adjusted under 35 U.S.C. 154(b) by 699 days.

(21) Appl. No.: 14/503,203

(22) Filed: Sep. 30, 2014

(65) Prior Publication Data

US 2015/0245250 A1 Aug. 27, 2015

Related U.S. Application Data

(60) Provisional application No. 61/943,228, filed on Feb. 21, 2014.

(51) Int. Cl.
| | | |
|---|---|---|
| *H04L 5/00* | (2006.01) | |
| *H04L 12/709* | (2013.01) | |
| *H04W 28/12* | (2009.01) | |
| *H04W 28/02* | (2009.01) | |

(52) U.S. Cl.
CPC .............. *H04W 28/12* (2013.01); *H04L 5/001* (2013.01); *H04L 45/245* (2013.01); *H04L 5/0098* (2013.01); *H04W 28/02* (2013.01)

(58) Field of Classification Search
None
See application file for complete search history.

(56) References Cited

U.S. PATENT DOCUMENTS

| | | |
|---|---|---|
| 8,711,785 B2 | 4/2014 | Gholmieh et al. |
| 9,204,387 B2 | 12/2015 | Wong |

(Continued)

FOREIGN PATENT DOCUMENTS

| | | |
|---|---|---|
| CN | 101978757 | 2/2011 |
| CN | 102918893 | 2/2013 |

(Continued)

OTHER PUBLICATIONS

Ericsson, ST-Ericsson, Methods for in-device coexistence interference avoidance, 3GPP TSG-RAN WG2 Meeting #71 bis R2-105743, [online], Oct. 5, 2010, pp. 1-5 [Accessed on Sep. 9, 2016], http://www.3gpp.org/ftp/tsg_ran/WG2_RL2/TSGR2_71bis/Docs/R2-105743.zip.

*Primary Examiner* — Ayaz R Sheikh
*Assistant Examiner* — Mariela Vidal Carpio
(74) *Attorney, Agent, or Firm* — Fay Kaplun & Marcin, LLP

(57) ABSTRACT

A device and method for throttling carrier aggregation (CA) in a device connected to a CA enabled network. The method includes determining that a carrier aggregation state of the device is enabled by a network component of a CA enabled network to which the device is connected, determining at least one condition indicating that the carrier aggregation functionality is unnecessary, generating a throttling indication to indicate to the network that a secondary serving cell (SCell) providing a secondary component carrier (SCC) in the carrier aggregation functionality is to be disabled and transmitting the throttling indication to the network component.

20 Claims, 6 Drawing Sheets

(56) References Cited

U.S. PATENT DOCUMENTS

| | | | |
|---|---|---|---|
| 2007/0207742 A1* | 9/2007 | Kim | H04B 7/12 455/69 |
| 2012/0140743 A1 | 6/2012 | Pelletier et al. | |
| 2012/0250578 A1* | 10/2012 | Pani | H04W 48/12 370/254 |
| 2013/0194947 A1* | 8/2013 | Ehsan | H04L 5/0098 370/252 |
| 2013/0201834 A1 | 8/2013 | Klingenbrunn et al. | |
| 2013/0237208 A1* | 9/2013 | Vujcic | H04B 7/15507 455/418 |
| 2013/0343261 A1* | 12/2013 | Gonsa | H04B 7/2606 370/315 |
| 2014/0233469 A1* | 8/2014 | Seo | H04L 5/001 370/329 |
| 2015/0189627 A1* | 7/2015 | Yang | H04L 5/0098 370/280 |
| 2015/0365863 A1* | 12/2015 | Uchino | H04W 36/14 455/436 |
| 2016/0286483 A1* | 9/2016 | Bergstrom | H04W 48/18 |

FOREIGN PATENT DOCUMENTS

| | | |
|---|---|---|
| JP | 2013-531944 | 8/2013 |
| JP | 2015-512184 | 4/2015 |
| WO | 2011/157364 | 12/2011 |
| WO | 2013/112848 | 8/2013 |
| WO | 2013/116040 | 8/2013 |

\* cited by examiner

SYSTEM AND METHOD FOR THROTTLING CARRIER AGGREGATION ACTIVATION

PRIORITY CLAIM/INCORPORATION BY REFERENCE

This application claims priority to U.S. Provisional Application 61/943,228 entitled "System and Method for Throttling Carrier Aggregation Activation," filed on Feb. 21, 2014, the entirety of which is incorporated herein by reference

BACKGROUND

Long-term evolution ("LTE") is a wireless communication standard used for high-speed data exchange for mobile devices and data terminals. LTE-Advanced is a major enhancement to the LTE standard. Within the LTE-Advanced standard, carrier aggregation is used to increase the bandwidth, and thereby increase the bitrates. Carrier aggregation has been introduced in the 3rd Generation Partnership Project ("3GPP") Release 10 (LTE-Advanced standard) to provide wider than 20 MHz transmission bandwidth to a single device (e.g., user equipment or "UE") while maintaining the backward compatibility with legacy UEs. Specifically, carrier aggregation may be defined as the aggregation of two or more component carriers in order to support wider transmission bandwidths. Carrier aggregation configuration may be defined as a combination of carrier aggregation operating bands, each supporting a carrier aggregation bandwidth class by a UE. The bandwidth class may be defined by the aggregated transmission bandwidth configuration and maximum number of component carriers supported by a UE. Thus, a UE may indicate a capability of performing the carrier aggregation functionality to a network component that assigns the carrier aggregation configuration thereto.

SUMMARY

In one exemplary embodiment, a user equipment (UE) configured with a carrier aggregation functionality performs a method. The method includes determining that a carrier aggregation state of the UE is enabled by an evolved NodeB (eNB) of a Long Term Evolution (LTE) network to which the UE is connected, determining at least one condition indicating that the carrier aggregation functionality is unnecessary, generating a throttling indication to indicate to the eNB that a secondary serving cell (SCell) providing a secondary component carrier (SCC) in the carrier aggregation functionality is to be disabled and transmitting the throttling indication to the eNB.

In another exemplary embodiment, a user equipment (UE) device configured with a carrier aggregation functionality having a memory, a processor and a transceiver is described. The UE includes a memory storing a set of instructions. The processor is configured to execute the instructions, wherein the executing of the instructions causes the processor to determine a carrier aggregation state of the UE device, determine a condition of the UE device, determine, based on the condition, that the carrier aggregation state of the UE device should be in a different carrier aggregation state, generating a throttling indication to indicate to a network component that the UE device should be in the different carrier aggregation state. The transceiver is configured to transmit the throttling indication to the network component.

In a further exemplary embodiment, a non-transitory computer readable storage medium including a set of instructions is described. The instructions, when executed, cause a processor to determine that a carrier aggregation state of a user equipment (UE) device is enabled by an evolved NodeB (eNB) of a Long Term Evolution (LTE) network to which the UE is connected, determine at least one condition indicating that the carrier aggregation functionality is unnecessary and generate a throttling indication to indicate to the eNB that a secondary serving cell (SCell) providing a secondary component carrier (SCC) in the carrier aggregation functionality is to be disabled.

DETAILED DESCRIPTION

Figure 1:
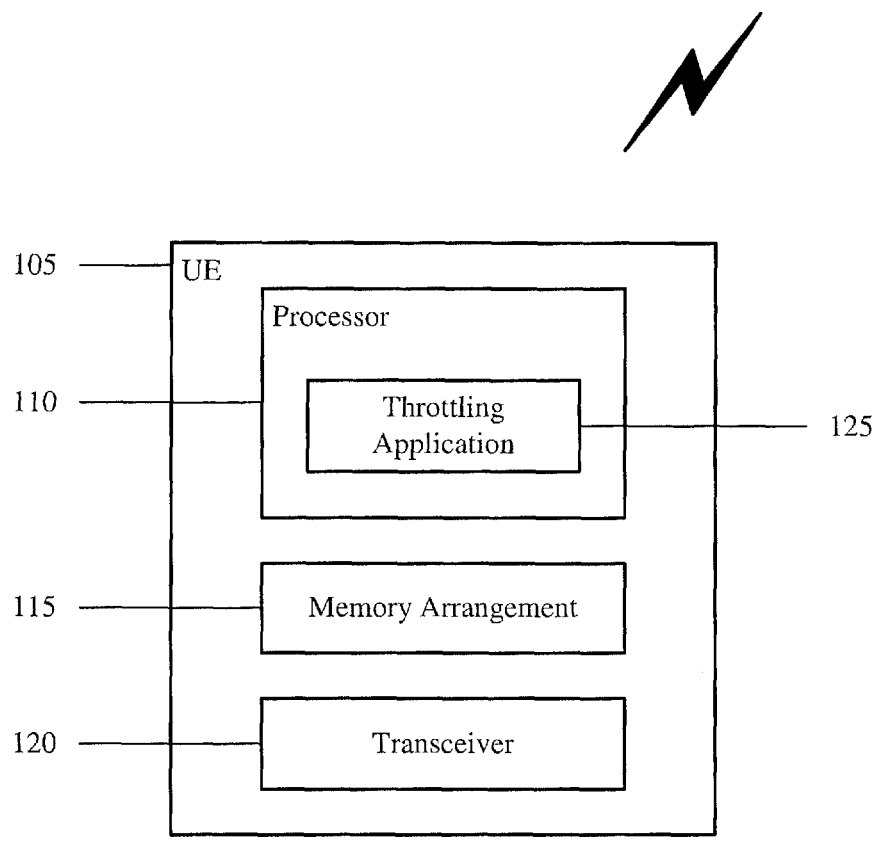
FIG. 1 shows an exemplary system in which a user equipment throttles carrier aggregation activation of component carriers.

The exemplary embodiments may be further understood with reference to the following description and the appended drawings, wherein like elements are referred to with the same reference numerals. The exemplary embodiments show a system and method for a serving cell used in a carrier aggregation functionality to be throttled for activation or deactivation based upon an indication transmitted from a user equipment (UE) using the carrier aggregation functionality. Carrier aggregation requires additional power consumption for a variety of reasons. Carrier aggregation also utilizes one or more serving cells. Thus, to conserve a limited power supply on the UE or to perform a more efficient transmission using the carrier aggregation functionality, the UE may wish to activate and/or deactivate select serving cells. Specifically, the UE may transmit an indication for scheduling to be started or stopped on the select serving cells. The carrier aggregation, the throttling, the serving cells, the UE, the activating/deactivating, and related methods will be described in further detail below.

When carrier aggregation is used, there may be a number of serving cells for each of the component carriers. The coverage of the serving cells may differ due to both component carrier frequencies and power planning, which is useful for heterogeneous network planning. A radio resource control (RRC) connection is handled by one cell, namely the primary serving cell (PCell), served by the primary component carrier (PCC) for uplink (UL) and downlink (DL). Specifically, with the LTE-Advanced network, the PCell may be an Evolved Node B (eNB) which is a hardware network component connected to a mobile network for communicating directly with UEs in a substantially similar manner as base transceiver stations in a GSM network. The other component carriers may be referred to as secondary component carriers (SCC) for UL and DL, serving the secondary serving cells (SCells). The SCCs are added and removed as required, while the PCC is changed at handover.

The SCells may also be eNBs. Those skilled in the art will understand that the PCell and SCells are logical constructs allowing for the addition of SCells as needed. The PCell is the main cell that is used for all RRC signaling and control procedures, while the SCell is considered an augmentation to the PCell.

Because carrier aggregation relates to using at least one SCC which is additional to using the PCC, the UE may be required to use an increased power consumption for each SCC. That is, a comparison for power consumption would show that a carrier aggregation disabled UE may require a first power value (comparable to using the PCC in carrier aggregation) while a carrier aggregation enabled UE may require a second power value derived from further power for each SCC used in the carrier aggregation configuration in addition to the first power value used for the PCC. Those skilled in the art will understand that further power is required for each SCC as the UE must monitor the channels corresponding to the SCC to determine when a DL is to be received.

Also, with carrier aggregation using at least one SCC which is additional to using the PCC, the network characteristics of the PCC and SCC providing its transmission functionality within the carrier aggregation scheduling are independent of one another. For example, a first SCC may have a first load while a second SCC may have a second load. The first and second loads are characteristics of the eNBs providing the component carrier. Therefore, these load values are independent of one another. There may also be further SCCs that are available for use but not selected for the UE in the carrier aggregation scheduling. Those skilled in the art will understand that a SCC having certain characteristics may provide a sub-optimal transmission functionality.

Carrier aggregation provides an increased transfer rate for data exchange and is very useful when a relatively large amount of data is received. However, in a first example, when little to no data exchange is occurring, the benefits of carrier aggregation are no longer used but the power consumption effect still remains. In a second example, when select SCCs are being used when more optimal SCCs are available for use, a more inefficient transmission using carrier aggregation results. In a third example, there may be scenarios where a transceiver of the UE may be scheduled to utilize a receiving component for a select SCC for a different reason that may result in loss of data.

Carrier aggregation is determined by the network. The UE only indicates that it is carrier aggregation capable. The UE remains in a carrier aggregation enabled state when the network has provided the carrier aggregation configuration. As will be described in greater detail below, the exemplary systems and methods may be used such that the UE provides an indication to throttle the component carriers when the above exemplary scenarios exist. It should be noted that other scenarios may also exist in which the throttling of the component carriers may be useful. The exemplary embodiments may also be modified for these other scenarios.

It should also be noted that with carrier aggregation, the UE may be configured with cross carrier scheduling. When LTE-Advanced carrier aggregation is used, it is necessary to be able to schedule the data across the carriers and to inform the UE of the format of various data being transmitted in each component carrier such as physical downlink shared channel (PDSCH) data. All of this information may be transmitted through the PCC if cross carrier scheduling is enabled. Enabling of the cross carrier scheduling is achieved individually via the RRC signaling on a per component carrier basis or a per terminal basis. When no cross carrier scheduling is arranged, the downlink scheduling assignments are achieved on a per carrier basis. That is, they are valid for the component carrier on which they were transmitted by an infra network vendor. For the uplink, an association is created between one downlink component carrier and an uplink component carrier. In this way, when uplink grants are sent, the UE is aware of which uplink component carrier it applies.

According to the exemplary embodiments, although carrier aggregation is ultimately a determination made by the network, the UE may provide an indication that may be used by the network to start or stop a scheduling of component carriers in the carrier aggregation functionality. Specifically, the UE may initiate a response from the network to throttle the activation or deactivation of component carriers. Accordingly, an exemplary scenario in which the exemplary embodiments may apply is when a network leaves a UE in a carrier aggregation enabled state even while data exchange is very low or null in DL. The carrier aggregation enabled UE may also not be sending a substantial amount of data in the UL. That is, an overall data exchange may be minimal where the benefits of carrier aggregation are not applicable while the power consumption drawback is still in effect.

The UE may throttle the activation/deactivation of the component carriers by generating an indication that may indicate to the network that the component carriers are to be activated or deactivated. Specifically, the indication may be a setting for channel state information. For example, the indication may indicate that the UE has a low Reference Signal Received Power (RSRP) and/or a low Reference Signal Received Quality (RSRQ). Specifically, the RSRP and/or RSRQ may be measured for the component carriers in the carrier aggregation configuration. The RSRP may relate to an LTE specific metric that averages radio frequency (RF) power in all reference signals in a passband such that the RSRP measurement bandwidth is equivalent of only a single subcarrier. Accordingly, the RSRP measures a signal power from a specific sector while potentially excluding noise and interference from other sectors which is in contrast to a Received Signal Strength Indicator (RSSI). A low RSRP value may indicate that the reference signals are being received in a low power. That is, the low RSRP value is indicative that a most recent signal received by the UE may be unreliable. Therefore, the network may be aware of the poor quality of the current configuration relating to the component carrier. With such an indication, the component carrier may be deactivated. The converse may also be used when the indication provides a high RSRP value to throttle an activation of the component carrier.

The RSRQ may also relate to an LTE specific metric that is derived from the number N of reference bands, the RSRP, and the RSSI. Specifically, a quotient is calculated from taking a product of the N reference bands and the RSRP value divided by the RSSI value. Accordingly, the RSRQ may indicate the portion of pure power of the received signal over an entire E-UTRA power received by the UE. Therefore, a low RSRQ may also indicate that the reference signals are being received in a low power which may be unreliable. The network may then be aware of the poor quality of the current configuration relating to the SCells. Again, the converse may also be used when the indication provides a high RSRQ value to throttle an activation of the component carrier.

It should be noted that the above examples of the indications are only exemplary. As will be used herein, the Channel State indication (CSI) may be set to a particular value to throttle the activation or deactivation of select component carriers. For example, for a deactivation throttle, the CSI may be set to zero. Those skilled in the art will understand that the CSI may represent any measured network metric that may have the same result of the deactivation throttle.

It should also be noted that the above examples setting the CSI is only exemplary. In another exemplary embodiment, the UE may transmit a notification that provides information used to throttle the activation or deactivation of select component carriers. Specifically, the UE may send a UE triggered notification to the eNB. For example, the notification may state that a particular component carrier may be deactivated. That is, the network that receives the notification may not be required to determine the meaning of a particular CSI value that is received.

The exemplary embodiments provide a variety of scenarios in which the throttling of the component carriers used in the carrier aggregation functionality are to be activated or deactivated. For illustrative purposes, the scenarios are described with reference to deactivating component carriers, specifically the SCC. However, the exemplary embodiments may also be used in a substantially similar manner to have an opposite effect of activating the component carriers.

The examples of different scenarios where throttling of component carriers may be used are described in detail below. However, these examples may be summarized as follows. In a first example, the UE may be left in the carrier aggregation enabled state but no longer requires the benefits of carrier aggregation, which causes unnecessary power consumption. That is, the DL and UL requirements do not necessitate using carrier aggregation. In a second example, the UE may be left in the carrier aggregation enabled state but has now established a connection to a further network such as a WiFi network (not shown). The further network may provide a more optimal data transmission rate than the carrier aggregation functionality. With the carrier aggregation functionality still enabled, this causes unnecessary power consumption. In a third example, the UE may be left in the carrier aggregation enabled state but recognizes that select component carriers are no longer being scheduled or used which causes unnecessary power consumption. In a fourth example, the transceiver of the UE may be a SR-LTE transceiver such that tuning away from LTE to monitor CDMA2000 results in a loss of data. In a fifth example, the UE may use the carrier aggregation functionality that is enabled but determine that select component carriers being scheduled have a poor throughput. When the UE makes any of these determinations, an application executing on the UE may cause the UE to transmit an indication to the network that carrier aggregation should be deactivated.

FIG. 1 shows an exemplary system 100 in which a UE 105 throttles carrier aggregation activation of component carriers. The system 100 includes a UE 105 and an eNB 130. As discussed above, the UE 105 may associate with the eNB 130 to join the network corresponding to the eNB 130 (e.g., LTE network). The UE 105 may also include the carrier aggregation functionality with or without cross-carrier scheduling. Thus, the UE 105 may indicate to the eNB 130 that it is carrier aggregation capable. As the UE 105 is associated with the eNB 130, the eNB 130 may provide the carrier aggregation configuration for component carriers to be used by the UE 105 when resources are available for the carrier aggregation functionality in which the eNB 130 may be the PCell and further eNBs (not shown) may be the SCells.

The UE 105 may be any electronic component configured to join a network via the eNB 130. For example, the UE 105 may be a portable device such as a cellular phone, a smartphone, a tablet, a phablet, a laptop, etc. Specifically, the UE 105 may be anyelectronic device that has a limited power supply. As shown in FIG. 1, the UE 105 may include a processor 110, a memory arrangement 115, and a transceiver 120. However, the UE 105 may also include further components such as a display device, an input/output (I/O) device, and other components such as a portable power supply, an audio I/O device, etc.

The processor 110 may be configured to execute a plurality of applications of the UE 105. For example, the applications may include a web browser when connected to a communication network via the transceiver 120. Accordingly, data may be exchanged with the network. More specifically, the data may be exchanged using carrier aggregation to increase a rate in which the data is exchanged. In another example, the applications may include a throttling application 125 that determines when the indication to throttle the activation or deactivation of component carriers is to be generated and transmitted to the eNB 130. It should be noted that the throttling application 125 being an application (e.g., a program) executed by the processor 110 is only exemplary. The throttling application 125 may also be represented as a separate incorporated component of the UE 105 or may be a modular component coupled to the UE 105. The memory arrangement 115 may be a hardware component configured to store data related to operations performed by the UE 105. Specifically, the memory arrangement 115 may store the various information used as a basis for determining whether the throttling application 125 is to generate and transmit the indication.

Turning to the examples, in a first scenario, the throttling of component carriers used in carrier aggregation may relate to when the UE 105 is idle. Activation of the carrier aggregation functionality differs between different networks. However, there may be occasions where the carrier aggregation functionality remains activated even though the UE 105 is idle. If the UE 105 is idle, transmissions using the carrier aggregation functionality may not be necessary. That is, the SCC may be throttled to be deactivated to conserve power. Therefore, the exemplary embodiments may provide a mechanism for the UE 105 to determine current operating conditions of the UE 105 and initiate the throttling for deactivation of the SCC and, further, of the carrier aggregation functionality altogether. For example, the operating conditions of the UE 105 may be that a display device of the UE 105 has been deactivated manually or from an idle period extending beyond a time limit. The operating conditions may also be that there is a low throughput for background data such as no audio is streaming or downloads. The UE may transmit an indication to the network via the eNB 130 for the throttling. An example of the indication may be setting the CSI for the SCell to zero.

It should be noted that the converse of the first scenario may also be used. That is, the operating conditions of the UE may indicate that the carrier aggregation functionality may be preferred. Thus, the indication may initiate the throttling for activating the carrier aggregation functionality by the network as well as activation of the SCCs.

Figure 2:
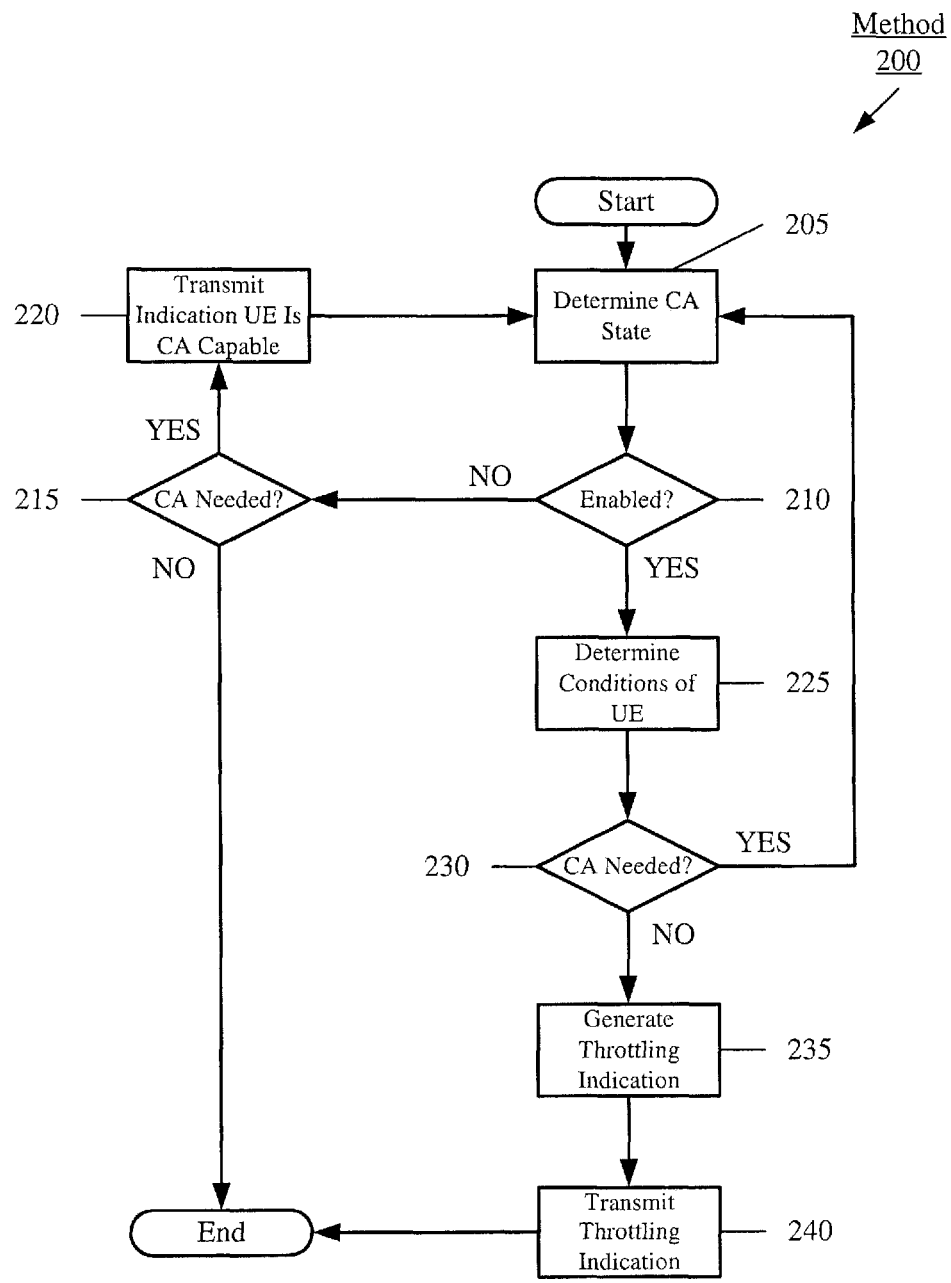
FIG. 2 shows a first exemplary method for a user equipment throttling carrier aggregation activation.

FIG. 2 shows an exemplary method 200 for the UE 105 throttling carrier aggregation activation. Specifically, the method 200 relates to the above-described first scenario in which the UE 105 is idle. In step 205, the throttling application 125 determines the carrier aggregation state of the UE 105. In step 210, the throttling application 125 determines whether the carrier aggregation functionality is in an enabled state as configured by the eNB 130 of the network. If the carrier aggregation functionality is disabled, the throttling application 125 continues the method 200 to step 215 in which it determines whether carrier aggregation is needed. If needed, the throttling application 125 continues the method 200 to step 220 where an indication is transmitted from the UE 105 to the eNB 130 that the UE 105 is carrier aggregation capable. It should be noted that the carrier aggregation capable indication may have already been transmitted. However, a subsequent transmission may provide further indication or preference for carrier aggregation to be scheduled for the UE 105.

Returning to step 210, if the throttling application 125 determines that the carrier aggregation functionality is enabled, the throttling application 125 continues the method 200 to step 225. In step 225, the throttling application 125 determines the operating conditions of the UE 105.

Specifically, the operating conditions may relate to configurations of various components, power consumptions of the various components, etc. As described above, one example of the operating conditions may be when the display device of the UE 105 has been deactivated.

In step 230, the throttling application 125 determines whether the carrier aggregation functionality is still required. If required, the throttling application 125 returns the method 200 to step 205. However, if the throttling application 125 determines that the conditions of the UE 105 are indicative of the carrier aggregation functionality not being required, the throttling application 125 continues the method 200 to step 235. In step 235, the throttling application generates an indication that throttles the deactivation of the component carriers used in the carrier aggregation functionality that may also disable the carrier aggregation functionality (as decided by the eNB 130). In step 240, this indication is transmitted.

In a second scenario, the throttling of component carriers used in carrier aggregation may relate to when the UE 105 is connected to a WiFi network. More generally, the second scenario may relate to a network connection that provides a data transmission rate that is more optimal than the carrier aggregation functionality. However, for illustrative purposes and used herein, this scenario is represented as a connection to a WiFi network. Again, activation of the carrier aggregation functionality differs between different networks. However, there may be occasions where the carrier aggregation functionality remains activated even though the connection to the WiFi network is established. When the connection to the WiFi network is established and the WiFi network is used primarily for data transmissions (e.g., more than half), transmissions using the carrier aggregation functionality may not be necessary. That is, the SCC may be throttled to be deactivated to conserve power. A connection to the PCC may still be maintained for other purposes. Therefore, the exemplary embodiments may provide a mechanism for the UE 105 to determine network connections that may negate the need for the carrier aggregation functionality and initiate the throttling for deactivation of the SCC and, further, of the carrier aggregation functionality altogether. It should be noted that the UE 105 may verify that there are no pending high speed data transfers that would use the PCCs and SCCs.

Furthermore, if the UE 105 has already had the carrier aggregation functionality deactivated by the network (e.g., receiving an indication from the eNB 130), the UE 105 may optionally terminate monitoring the SCC. The UE 105 may further report pathloss (PL) compensated estimates from the PCC to conserve additional power. However, if the carrier aggregation functionality remains active for the UE 105, the indication may be transmitted, particularly when there are no pending transfers.

It should be noted that the converse of the second scenario may also be used. That is, there may no longer be a connection to the WiFi network. Having to fall back to the PCCs and SCCs for data transfers, the UE 105 may initiate the throttling for activating the carrier aggregation functionality by the network as well as activation of the SCCs.

Figure 3:
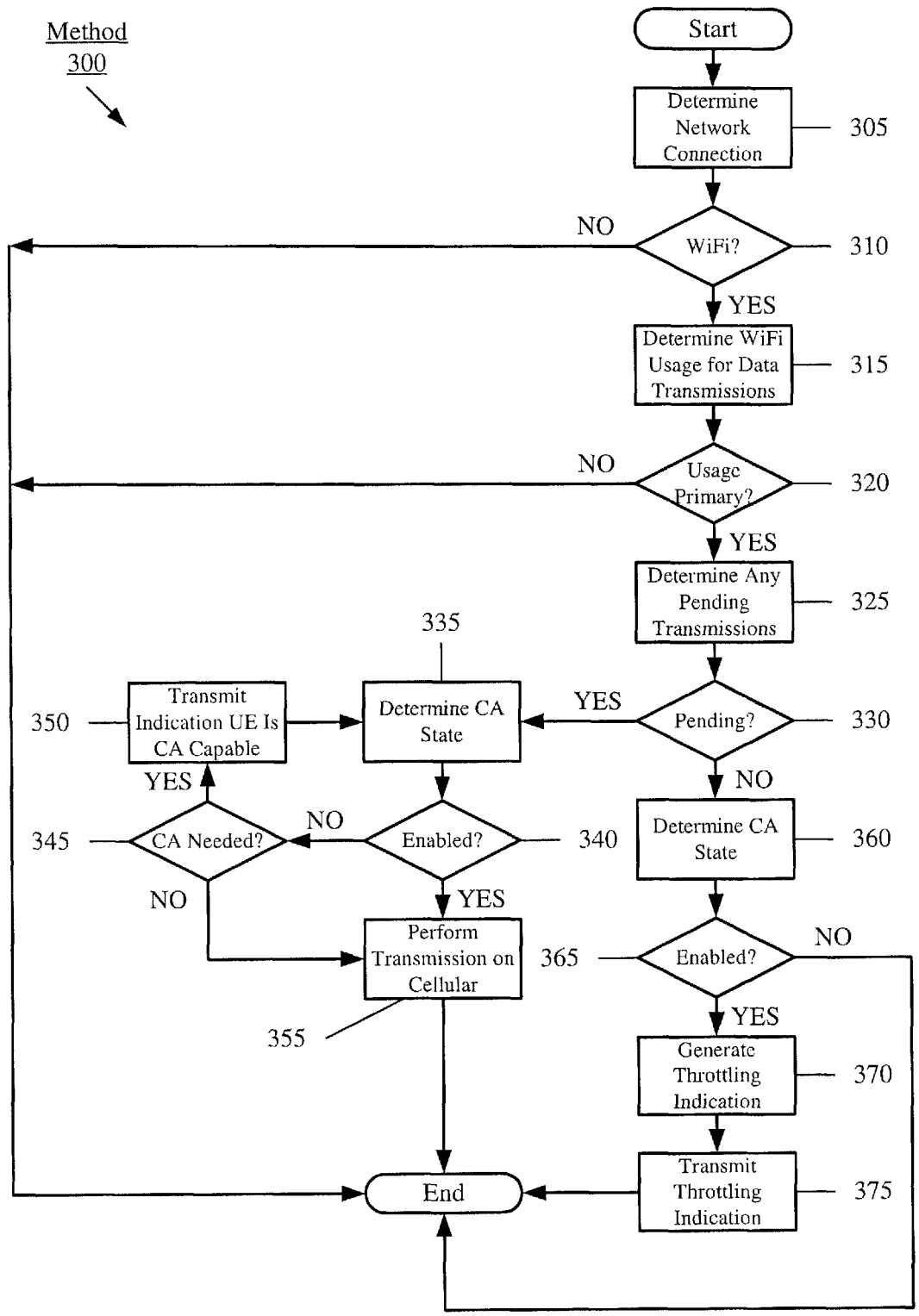
FIG. 3 shows a second exemplary method for a user equipment throttling carrier aggregation activation.

FIG. 3 shows an exemplary method 300 for the UE 105 throttling carrier aggregation activation. Specifically, the method 300 relates to the above-described second scenario in which the UE 105 has established a connection to a WiFi network. In step 305, the throttling application 125 determines the network connections that have been established. In step 310, the throttling application 125 determines whether there is a network connection to a WiFi network.

If the UE 105 is connected to a WiFi network, the throttling application 125 continues the method 300 to step 315. In step 315, the throttling application 125 determines the WiFi usage for data transmissions. Those skilled in the art will understand that a connection to the WiFi network does not necessarily mean that a more optimal data transmission rate is provided. Thus, in step 320, the throttling application 125 determines whether the WiFi usage for data transmissions is primary to other sources of data transmissions. For example, more than half of the data transmissions being performed over the WiFi network may indicate a primary WiFi usage.

If the throttling application 125 determines that the WiFi usage is primary for data transmissions, the throttling application 125 continues to the method 300 to step 325. In step 325, the throttling application 125 determines whether there are any pending transmissions to be performed using a non-WiFi network such as a cellular network including the LTE network. For example, the pending transmissions may relate to a data transmission that is already in progress.

If the throttling application 125 determines that there is a pending data transmission, the throttling application 125 continues the method 300 to step 335. In step 335, the throttling application 125 may determine the carrier aggregation state. In step 340, the throttling application determines whether the carrier aggregation states is enabled. If disabled, the throttling application 125 continues the method 300 to step 345 in which it determines whether the carrier aggregation is needed for the pending transmission. If needed, the throttling application 125 continues the method 300 to step 350. In step 350, the UE 105 transmits an indication to the eNB 130 that it is carrier aggregation capable. However, returning to step 340, if the carrier aggregation is already enabled or returning to step 345, if the carrier aggregation functionality is not needed, the throttling application 125 continues the method 300 to step 355. In step 355, the pending transmission is performed over the cellular network.

Returning to step 330, if there are no pending transmissions, the throttling application 125 continues the method 300 to step 360. In step 360, the throttling application determines the carrier aggregation state. In step 365, the throttling application determines whether the carrier aggregation state is enabled. If enabled, in step 370, the throttling application 125 generates the indication and in step 375, the indication is transmitted to the eNB 130. It should be noted that if carrier aggregation is determined to be disabled in step 365, the method 300 may include a further step in which the monitoring of the SCC is terminated and pathloss compensated estimates from the PCC are reported.

In a third scenario, the throttling of component carriers used in carrier aggregation may relate to when a component carrier is not being used. Again, activation and deactivation of component carriers differs between different networks. However, in some scenarios, the UE 105 may be held in a configured/activated carrier aggregation state that consumes more power even if no data transmission is ongoing. In another example, data transmissions may be performed using carrier aggregation such that a PCC, a first SCC, and a second SCC are used. Subsequently, the carrier aggregation remains activated and used. However, the second SCC may no longer be utilized. Therefore, the exemplary embodiments may provide a mechanism for the UE 105 to monitor PCC and SCC usage. This usage may be determined based upon a variety of different network metrics such as a RSRP, a RSRQ, a modulation and coding scheme (MOS), a rank indicator (RI), a transmission mode (TM), a transport block size (TBS), a load, etc. The monitored value and a time value may be used as a basis for whether the SCC is no longer to be used. Specifically, the time value may be a predetermined threshold value in which, if the SCC has no scheduled data transmissions for that period of time, it is indicative of the SCC not being used. Accordingly, the UE 105 may throttle the deactivation of the SCC (i.e., implicitly deactivate the SCell for the carrier aggregation functionality on the UE 105) and transmit the indication of the CSI being zero for the SCell. Therefore, resources may be prevented from being scheduled on the SCell.

It should be noted that during this implicit deactivated state, the UE 105 may monitor the radio frequency (RF) environment delta between the PCC and SCC to determine whether the PCC has degraded compared to the SCC. If the PCC has degraded, the UE 105 may transmit a further indication in a substantially similar manner described above for throttling the activation of the SCC. By implicitly re-activating the SCC, a complete loss of data may be prevented. Furthermore, if data is scheduled on the PCC, the SCC may be re-activated immediately by listening to the PDCCH on the SCell as well.

Figure 4:
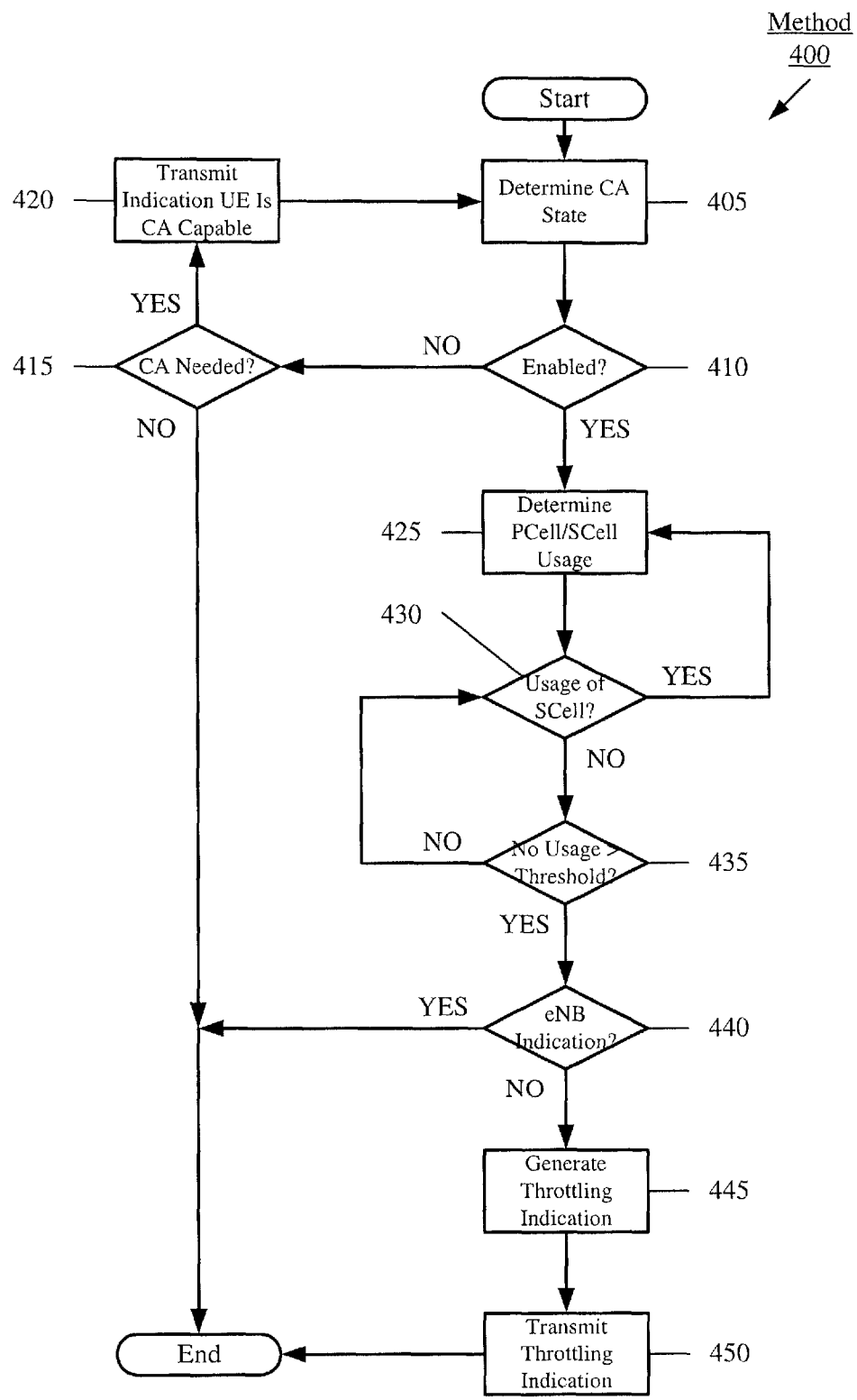
FIG. 4 shows a third exemplary method for a user equipment throttling carrier aggregation activation.

FIG. 4 shows an exemplary method 400 for the UE 105 throttling carrier aggregation activation. Specifically, the method 400 relates to the above-described third scenario in which a SCC has not been scheduled for at least a predetermined threshold amount of time. In step 405, the throttling application 125 determines the carrier aggregation state. In step 410, if the carrier aggregation state is disabled, the throttling application continues the method 400 to step 415 in which it determines whether carrier aggregation is needed. If needed, the throttling application 125 continues the method 400 to step 420 where an indication is transmitted from the UE 105 to the eNB 130 that the UE 105 is carrier aggregation capable.

Returning to step 410, if the carrier aggregation state is enabled, the throttling application 125 continues the method 400 to step 425. In step 425, the throttling application 125 determines the usage of the component carriers, specifically the SCCs that were used in the carrier aggregation functionality. In step 430, the throttling application 125 determines whether one or more of the current SCCS are being used. If a current SCC is still being used, the throttling application 125 returns the method 400 to step 425. However, if an SCC is no longer being used, the throttling application 125 continues the method 400 to step 435. In step 435, the throttling application 125 determines whether the SCC has not been used for at least a predetermined threshold amount of time. If still within this threshold time, the throttling application 125 returns the method 400 to step 430.

If more than the predetermined threshold amount of time has passed without the SCC being scheduled for use, the throttling application 125 continues the method 400 to step 440. In step 440, the throttling application 125 determines whether an indication has already been provided from the eNB 130 that the carrier aggregation has been disabled. If no indication has been received, the throttling application 125 continues the method 400 to step 445. In step 445, the throttling application 125 generates the indication for throttling the deactivation of the SCC and in step 450, the indication is transmitted.

It should be noted that the method 400 may include further steps. For example, when the eNB 130 has provided the indication that the carrier aggregation has been disabled or the SCC is not being scheduled, the throttling application 125 may indicate to the UE 105 that the monitoring of the SCC may be terminated as well as the pathloss of the PCC being reported to conserve power. Furthermore, after step 450, the throttling application 125 may perform steps of determined the integrity of the PCC compared to the SCC such as degrading in comparison thereto. Accordingly, the throttling application 125 may determine whether to transmit further indications to throttle for the activation of the component carrier.

In a fourth scenario, the throttling of component carriers used in carrier aggregation may relate to when the UE 105 has a specific transceiver, namely a single radio (SR)-LTE transceiver. The SR-LTE transceiver relates to a transceiving device that incorporates the functionalities corresponding to CDMA2000 and LTE. Those skilled in the art will understand that without the SR-LTE transceiver, the UE 105 is required to have two separate radios to be CDMA2000-capable and LTE-capable. The manner in which the SR-LTE transceiver operates to provide this combined functionality is using different protocol stacks sharing the hardware in a time-sliced manner. For example, when the UE is receiving a transmission over LTE, the SR-LTE transceiver periodically tunes away to CDMA2000 to receive paging messages. Despite this tuning away, the overall power use is minimized as a single radio uses less power than two radios.

The SR-LTE transceiver may use a first receiver for the PCC and at least one second receiver for respective SCCs. The SR-LTE transceiver also tunes away from the LTE to CDMA2000 by using the second receiver of the SCC to monitor the CDMA2000. In such a case, the UE may have an outage from LTE while monitoring CDMA2000. The exemplary embodiments provide a mechanism to avoid data loss from this tuning away by throttling the SCell to be deactivated during this period. Again, the indication may be a CSI being set to zero for the SCell. In this manner, the SCell may not be scheduled during the time period that the second receiver for the SCC is used to monitor CDMA2000.

It should be noted that a subsequent indication may be transmitted for the SCell to be re-scheduled once the tune away time period is over. That is, the second receiver is again available to receive on the SCC and benefit from the carrier aggregation functionality. This process may be repeated during the time that the carrier aggregation functionality is required at each time the second receiver tunes away from LTE to monitor CDMA2000.

Figure 5:
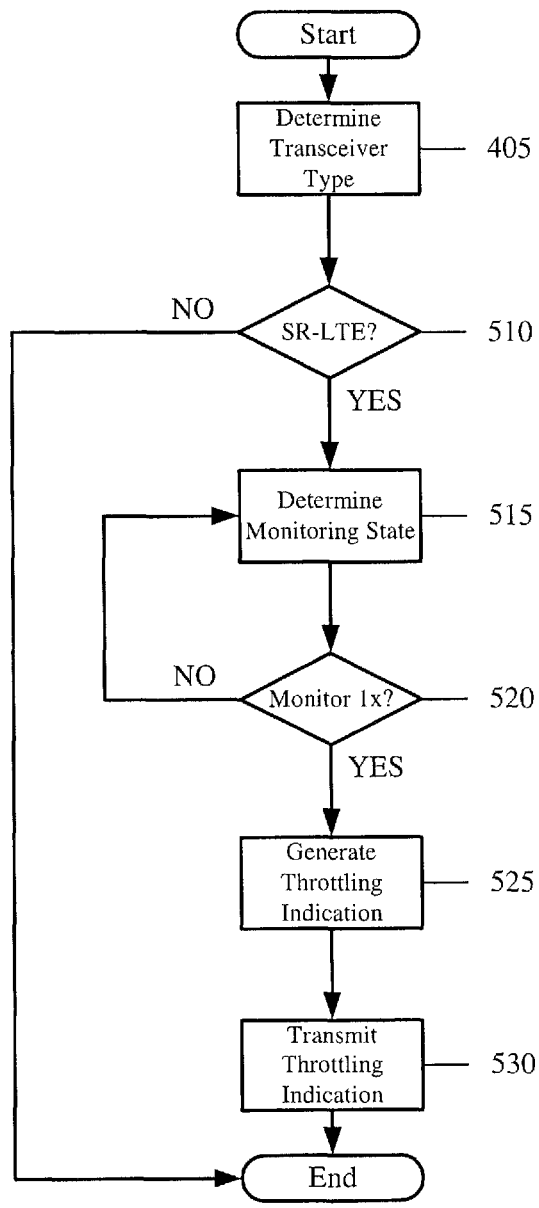
FIG. 5 shows a fourth exemplary method for a user equipment throttling carrier aggregation activation.

FIG. 5 shows an exemplary method 500 for the UE 105 throttling carrier aggregation activation. Specifically, the method 500 relates to the above-described fourth scenario in which the transceiver 120 is a SR-LTE transceiver. In step 405, the throttling application 125 determines the type of the transceiver 120. In step 510, the throttling application 125 determines whether the transceiver 120 is a SR-LTE transceiver.

If the transceiver 120 is a SR-LTE transceiver, the throttling application 125 continues the method 500 to step 515. in step 515, the throttling application 125 determines the monitoring state of the SR-LTE transceiver. Specifically, the throttling application 125 determines whether the SR-LTE transceiver is to monitor the CDMA2000 (i.e., 1×). If the receiver of the SR-LTE continues to stay on LTE, the throttling application 125 returns the method 500 to step 515. However, if the receiver of the SR-LTE is to tune away to the CDMA2000, the throttling application 125 continues the method 500 to step 525. In step 525, the throttling application generates the indication to throttle for deactivation of the SCC corresponding to the receiver tuning away to the CDMA2000. In step 530, the indication is transmitted.

It should be noted that the method 500 may be modified to be cyclical. Specifically, the tuning away from LTE to CDMA2000 may be performed periodically. During each time that the SR-LTE is to monitor CDMA2000, the indication may be transmitted. Each time this monitoring period ends, a further indication may be transmitted for throttling the re-activation of the SCC.

In a fifth scenario, the throttling of component carriers used in carrier aggregation may relate to when a sub-optimal component carrier is detected for an opportunity to use a more optimal component carrier based upon throughput. As discussed above, load on a component carrier is independent from other component carriers and are different based upon deployment. Different component carriers have different radio conditions and load. Thus, the throughput on different component carriers will also differ independently of each other. The exemplary embodiments provide a mechanism to select component carriers that provide the most optimal throughput. This may ultimately conserve power as the component carriers that have good throughput are used and component carriers having bad throughput are throttled to be deactivated such that a more optimal component carrier may be selected. Therefore, a total of N component carriers may be supported with less than N receivers on the transceiver.

The exemplary embodiments may measure a throughput for each component carrier. Subsequently, a throughput difference may be calculated for every pair of component carriers. For example, a RSRP or RSSI difference between the component carriers and/or heuristic throughput estimates on the different component carriers may be determined. If a throughput difference is determined to be greater than a predetermined threshold, the SCell corresponding to the SCC having the lower throughput value in the pair used to determine the difference may be throttled for deactivation.

As described in the above scenarios, the exemplary embodiments provide various mechanisms for the UE 105 to initiate a throttling for activation or deactivation of component carriers by the network dependent upon a variety of factors such as improved power conservation, improved transmission efficiency, etc. It should noted that various other scenarios may also apply for the exemplary throttling mechanism to be used and that the exemplary embodiments may be modified accordingly for these other scenarios.

Figure 6:
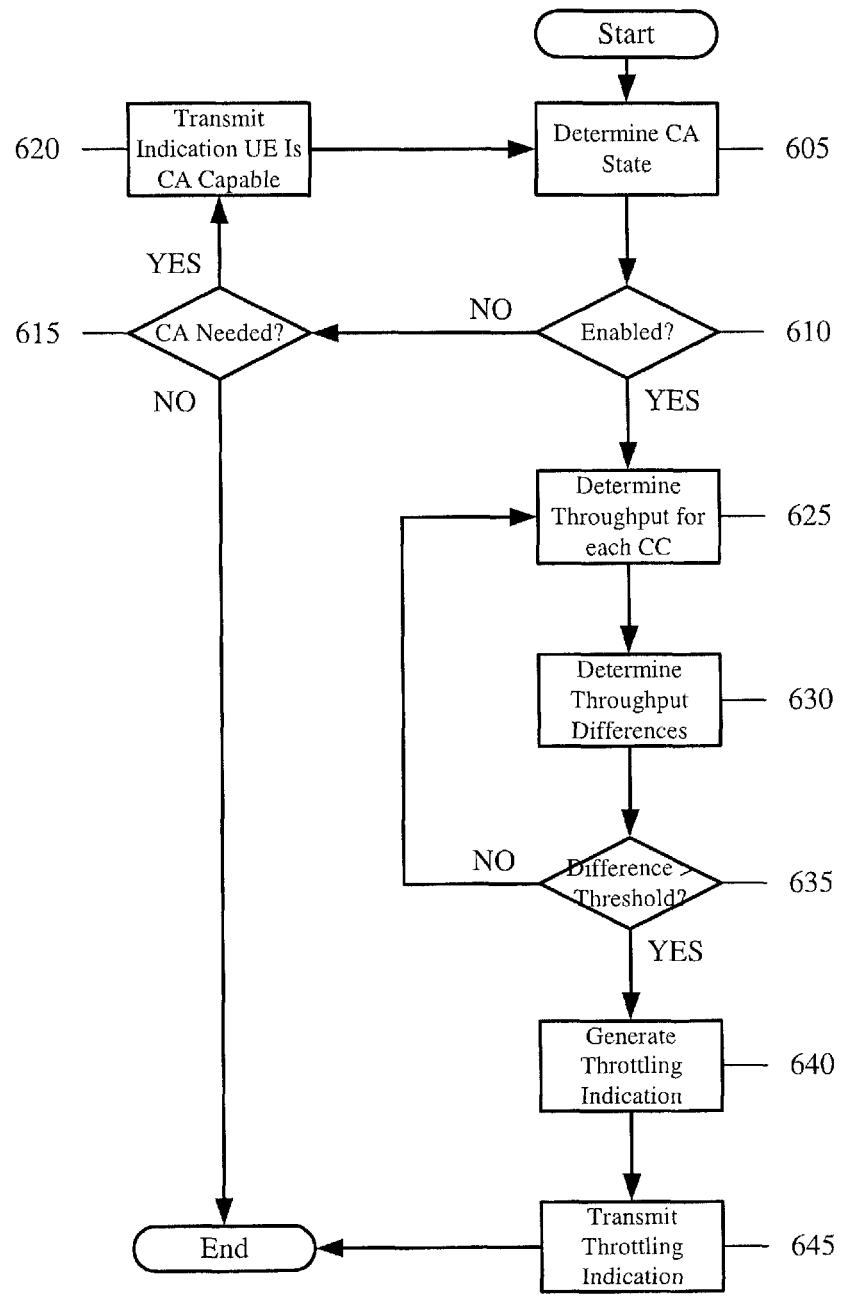
FIG. 6 shows a fifth exemplary method for a user equipment throttling carrier aggregation activation.

FIG. 6 shows an exemplary method 600 for the UE 105 throttling carrier aggregation activation. Specifically, the method 600 relates to the above-described fifth scenario in which the UE 105 determines that a component carrier is providing a poor throughput. In step 605, the throttling application 125 determines the carrier aggregation state of the UE 105. In step 610, the throttling application 125 determines whether the carrier aggregation functionality is in an enabled state as configured by the eNB 130 of the network. If the carrier aggregation functionality is disabled, the throttling application 125 continues the method 600 to step 615 in which it determines whether carrier aggregation is needed. If needed, the throttling application 125 continues the method 600 to step 620 where an indication is transmitted from the UE 105 to the eNB 130 that the UE 105 is carrier aggregation capable.

Returning to step 610, if the carrier aggregation functionality is enabled, the throttling application 125 continues the method 600 to step 625. In step 625, the throttling application 125 determines a throughput for each component carrier being used in the carrier aggregation data transmission. The throughput may be determined using any number of network metrics such as RSRP, RSRQ, etc. In step 630, the throttling application determines throughput differences between pairs of component carriers.

In step 635, the throttling application 125 determines whether a throughput difference for any pair of component carriers is greater than a predetermined threshold. If the throughput difference is less than the predetermined threshold, the throttling application returns the method 600 to step 625. However, if the throughput difference is greater than the predetermined threshold, the throttling application continues the method 600 to step 640. In step 640, the throttling application 125 generates an indication for throttling the deactivation of the SCell corresponding to the SCC having the lower throughput that resulted in the throughput difference being greater than the predetermined threshold. In step 645, the indication is transmitted.

It should be noted that the above-described scenarios are only exemplary and there may be many other scenarios for which carrier aggregation should be throttled (activated/deactivated). One or more of these exemplary scenarios and the corresponding methods may be executed simultaneously on the device such that each scenario may be handled. For example, the methods 200-600 may simultaneously be executed by the throttling application 125 of the UE 105. As some of the steps of the different methods are the same, these different steps may be performed and the results may be stored for use in other methods.

The exemplary embodiments provide a system and method for throttling an activation or deactivation of component carriers used in a carrier aggregation functionality in a UE. Specifically, the UE may include a throttling application that determines whether an indication is to be generated that provides information to the eNB of the LTE network whether the carrier aggregation functionality should be used or not such that the eNB may respond by activating or deactivating the component carriers.

It should also be noted that the above exemplary embodiments were described with reference to the carrier aggregation functionality of an LTE-Advanced network. Those skilled in the art will understand that the exemplary embodiments are not limited to LTE-Advanced networks, but may be implemented on any network that supports carrier aggregation in accordance with the exemplary functionalities described herein.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   at a user equipment (UE) configured with a carrier aggregation functionality:
   determining that the carrier aggregation functionality of the UE is enabled by an evolved NodeB (eNB) of a Long Term Evolution (LTE) network to which the UE has an LTE connection;
   determining whether the UE has established a simultaneous connection to a second network separate from the LTE network;
   when the UE has established the simultaneous connection, determining whether the second network is being used for at least a predetermined amount of data exchanges;
   when the second network is being used for at least the predetermined amount of data exchanges, generating a throttling indication to indicate to the eNB that a secondary serving cell (SCell) providing a secondary component carrier (SCC) in the carrier aggregation functionality is to be disabled;
   transmitting the throttling indication to the eNB;
   receiving, via the LTE connection with the eNB, an indication that the carrier aggregation functionality has been disabled; and
   terminating monitoring the SCC based on the indication that the carrier aggregation functionality has been disabled, wherein the simultaneous connection is maintained.

2. The method of claim 1, further comprising:
   determining, prior to the generating of the throttling indication, whether there is a pending data transmission to be transmitted by the UE via the LTE network; and
   transmitting, prior to the generating of the throttling indication, the pending data transmission via the LTE network using the carrier aggregation functionality.

3. The method of claim 1, wherein the second network is one of a WiFi network and a wireless local area network (WLAN).

4. The method of claim 1, wherein the throttling indication is a channel state indication.

5. The method of claim 1, wherein the connection to the LTE network is based on a radio resource control (RRC) connection between the UE and the eNB.

6. The method of claim 1, wherein the eNB is a primary cell (PCell) providing a primary component carrier (PCC).

7. The method of claim 1, wherein the SCC is one of a plurality of SCCs being monitored by the UE.

8. The method of claim 1, further comprising:
   transmitting, after terminating the monitoring of the SCC, a pathloss compensated estimate corresponding to the eNB.

9. The method of claim 1, wherein, when the UE determines that the carrier aggregation functionality of the UE is enabled, the UE is in an idle state.

10. A user equipment (UE) device configured with a carrier aggregation functionality, comprising:
    a memory storing a set of instructions;
    a processor configured to execute the instructions, wherein the executing of the instructions causes the processor to:
    determine whether the carrier aggregation functionality of the UE device is enabled;
    when the carrier aggregation functionality is enabled, determine whether the UE device has established a first connection to a first network providing the carrier aggregation functionality and a simultaneous second connection to a second, separate network;
    when the UE device has established the simultaneous second connection, determine whether the second network is being used for at least a predetermined amount of data exchanges;
    when the second network is being used for at least the predetermined amount of data exchanges, determine that the carrier aggregation functionality of the UE device should be disabled; and
    generate a throttling indication to indicate to a network component that the carrier aggregation functionality of the UE device should be disabled;
    receive an indication from the first network that the carrier aggregation functionality has been disabled;
    terminating monitoring a secondary component carrier (SCC) based on the indication from the first network that carrier aggregation has been disabled, wherein the simultaneous connection is maintained;
    a transceiver configured to transmit the throttling indication to the network component; and
    receive the indication from the first network that the carrier aggregation functionality has been disabled.

11. The UE of claim 10, wherein the executing of the instructions further causes the processor to:
    determine, prior to the generating of the throttling indication, whether there is a pending data transmission to be transmitted by the UE via the first network, wherein the first network is a Long Term Evolution (LTE) network; and
    transmit, prior to the generating of the throttling indication, the pending data transmission via the LIE network using the carrier aggregation functionality.

12. The UE of claim 10, wherein the second network is one of a WiFi network and a wireless local area network (WLAN).

13. The UE of claim 10, wherein the throttling indication is a channel state indication.

14. The UE of claim 10, wherein, when the UE determines that the carrier aggregation functionality of the UE is enabled, the UE is in an idle state.

15. A non-transitory computer readable storage medium including a set of instructions, wherein the instructions, when executed, cause a processor to:
    determine that a carrier aggregation functionality of a user equipment (UE) device is enabled by an evolved NodeB (eNB) of a Long Term Evolution (LTE) network to which the UE has an LTE connection;
    determine whether the UE device has established a simultaneous connection to a second network separate from the LTE network;
    when the UE device has established the simultaneous connection, determine whether the second network is being used for at least a predetermined amount of data exchanges;
    when the second network is being used for at least the predetermined amount of data exchanges, generate a throttling indication to indicate to the eNB that a secondary serving cell (SCell) providing a secondary component carrier (SCC) to the UE is to be disabled;

receive, via the LTE connection with the eNB, an indication that carrier aggregation functionality has been disabled; and terminating monitoring of the SCC based on the indication that the carrier aggregation functionality has been disabled, wherein the simultaneous connection is maintained.

16. The non-transitory computer readable storage medium of claim 15, wherein the executing of the instructions further causes the processor to:

determine, prior to the generating of the throttling indication, whether there is a pending data transmission to be transmitted by the UE via the LTE network; and transmit, prior to the generating of the throttling indication, the pending data transmission via the LTE network using the carrier aggregation functionality.

17. The non-transitory computer readable storage medium of claim 15, wherein the second network is one of a WiFi network and a wireless local area network (WLAN).

18. The non-transitory computer readable storage medium of claim 15, wherein the SCC is one of a plurality of SCCs being monitored by the UE.

19. The non-transitory computer readable storage medium of claim 15, wherein the executing of the instructions further causes the processor to:

transmit, after terminating the monitoring of the SCC, a pathloss compensated estimate corresponding to the eNB.

20. The non-transitory computer readable storage medium of claim 15, wherein the throttling indication is a channel state indication.

* * * * *

UNITED STATES PATENT AND TRADEMARK OFFICE
CERTIFICATE OF CORRECTION

PATENT NO. : 10,674,405 B2
APPLICATION NO. : 14/503203
DATED : June 2, 2020
INVENTOR(S) : Bhattacharjee et al.

It is certified that error appears in the above-identified patent and that said Letters Patent is hereby corrected as shown below:

In the Claims

Claim 11, Column 14, Lines 40-41:
"transmit, prior to the generating of the throttling indication, the pending data transmission via the LIE network" should read "transmit, prior to the generating of the throttling indication, the pending data transmission via the LTE network"

Signed and Sealed this
Twenty-eighth Day of July, 2020

Andrei Iancu
*Director of the United States Patent and Trademark Office*